(12) United States Patent
Subramaniam et al.

(10) Patent No.: US 8,667,079 B2
(45) Date of Patent: Mar. 4, 2014

(54) SHARED ACCESS TO A LOCAL DEVICE

(75) Inventors: Baskaran Subramaniam, San Jose, CA (US); Miguel J. Vega, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 13/161,942

(22) Filed: Jun. 16, 2011

(65) Prior Publication Data

US 2012/0324107 A1    Dec. 20, 2012

(51) Int. Cl.
*G06F 15/16*    (2006.01)

(52) U.S. Cl.
USPC ............................ 709/217; 709/203; 709/227

(58) Field of Classification Search
USPC .......................................... 709/203, 217, 227
See application file for complete search history.

(56) References Cited

U.S. PATENT DOCUMENTS

| 6,348,971 | B2 * | 2/2002 | Owa et al. ..................... 358/1.15 |
| 6,452,692 | B1 * | 9/2002 | Yacoub ....................... 358/1.15 |
| 7,706,017 | B2 * | 4/2010 | Ferlitsch ...................... 709/247 |
| 2005/0209842 | A1 | 9/2005 | Klein |
| 2009/0303521 | A1 | 12/2009 | Kumar |
| 2010/0131687 | A1 | 5/2010 | Li et al. |
| 2011/0252145 | A1 * | 10/2011 | Lampell et al. ............... 709/227 |

OTHER PUBLICATIONS

Pfeifle, Kurt, CUPS: Unix-Printing made easy—for Home Users and Network Administrators alike, http://www.sane.nl/events/sane2002/papers/SANE2002_3.pdf, May 27, 2002, 28 pages.
International Search Report and Written Opinion for PCT Application No. PCT/US2012/040921 dated Jan. 11, 2013, 14 pages.

* cited by examiner

*Primary Examiner* — Phuoc Nguyen
(74) *Attorney, Agent, or Firm* — Fletcher Yoder PC

(57) ABSTRACT

A method for providing a local device service over a network, where the local device service is not configured for network access. The method includes determining whether the local device is busy, and if the local device is not busy, broadcasting over the network an available first service provided by the local device. Then, if the local device is not busy and is selected by a computer, providing by the connecting station, the computer access to the local device.

15 Claims, 7 Drawing Sheets

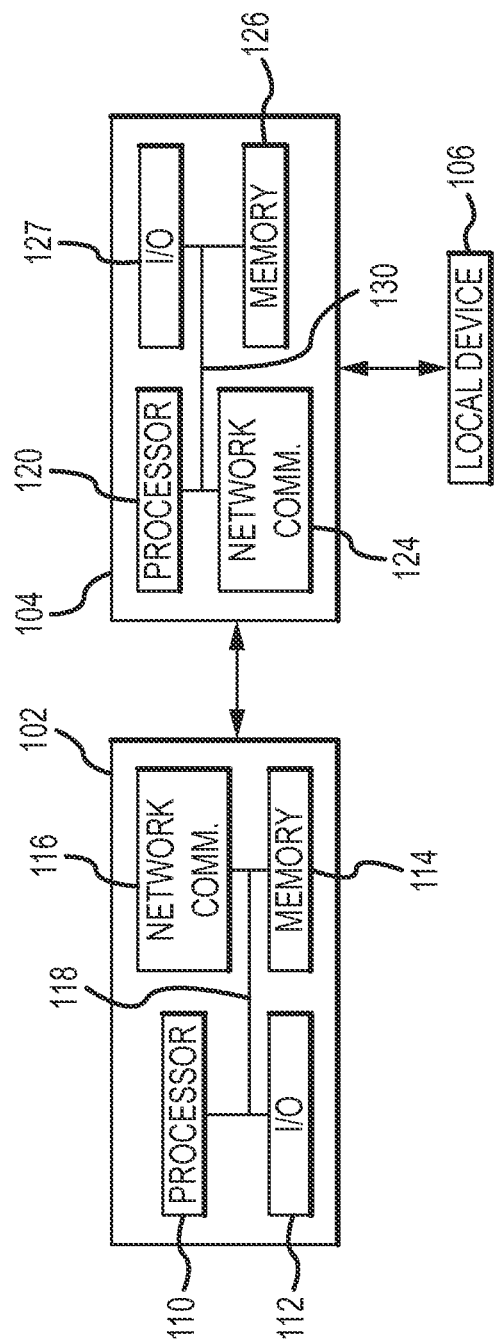

SHARED ACCESS TO A LOCAL DEVICE

TECHNICAL FIELD

The present invention relates generally to electronic devices, and more specifically, to sharing electronic devices via a network.

BACKGROUND

Computers and other electronic devices such as tablets, mobile phones, gaming consoles and other comparable devices (hereinafter a "computer") may be configured to be electronically connected to various external devices, for example, and not by way of limitation, printers, cameras, scanners, computers, phones, and the like (an "external device"). Many external devices may be configured to be connected to a computer through a network (a "network device") or locally (a "local device"). Network devices may be connected to multiple computers through a network, where each computer may individually access the network device. On the contrary, local devices often may only connect to a single computer at any given time. In order to connect the local device to another computer, the local device may need to be disconnected from the first computer. When a local device is locally connected to a computer, it may install (or require the user to install on the computer) a device specific driver. The driver allows the computer to communicate and provide commands to the local device. It is now more common for people to have more than a single computer at home, but many of these devices may be local devices, rather than network devices. For example, a family may have a single printer, but each member in the family may have his or her own computer.

SUMMARY

Examples of the disclosure may take the form of a method for providing a local device service over a network, where the local device is not configured for network access. The method includes determining whether the local device is busy, and if the local device is not busy, broadcasting over the network an available first service provided by the local device. Then, if the local device is not busy and is selected by a computer, providing the computer access to the local device.

Other examples of the disclosure may take the form of a method for connecting a computer to a service provided by a local device over a network. The method may include determining by the computer whether there is a service available over the network. If there is a service available, selecting a local device configured to provide the service. Once the local device is selected, communicating with a connection station in communication with the computer and the local device. Then, launching a driver on the computer corresponding to the local device.

Still other examples of the disclosure may take the form of a connecting station for providing network access to a local device. The connecting station may include a network interface configured to receive a service notification from a local device and a selection notification from a computer. The connecting station may also include a processor in communication with the network interface. The processor is configured to broadcast the service notification from the local device over a network to the computer, and provide the computer access to the local when the computer transmits the selection notification to the network interface.

BRIEF DESCRIPTION OF THE DRAWINGS

FIG. 2 is a block diagram of the system illustrated in FIG. 1A.

SPECIFICATION

Overview

In some embodiments herein, the disclosure may take the form of a method for providing access to local devices via a network (for example, WiFi, Ethernet, Bluetooth, and other networking topologies). The local device may be a non-networked device or may include at least one non-networked function. For example, the local device may be a multi-function printer, copier, scanner, where the scanner and copying functions may be configured to be locally accessed only. The method allows for the local device (or certain functions of the device) to be provided over the network, without requiring the local device to be specifically configured for network access. In other words, the disclosure provides for "out of the box" components to be available across a network, without substantially modifying a software driver corresponding to the computer and/or the local device.

Additionally, the disclosure may provide for multiple functions offered by the local device to be used in parallel. For example, the local device may include a printing function and a scanning function and the disclosure may connect the computer to the local device via a printer access, while providing a separate scanning access that may be used by a second computer.

In one embodiment, a connecting station may provide network access to a local device by a computer over a network. Although the connecting station may be placed between the communication of the local device and the computer, the computer and the device may appear (when connected) to each other as being connected locally (e.g., via a direct universal serial bus connection). In this manner, the local device and/or the computer may not have to be specially configured to appear on or connect to a network. The connecting station may also facilitate and/or translate the communications between the local device and the computer.

DETAILED DESCRIPTION

Figure 1A:
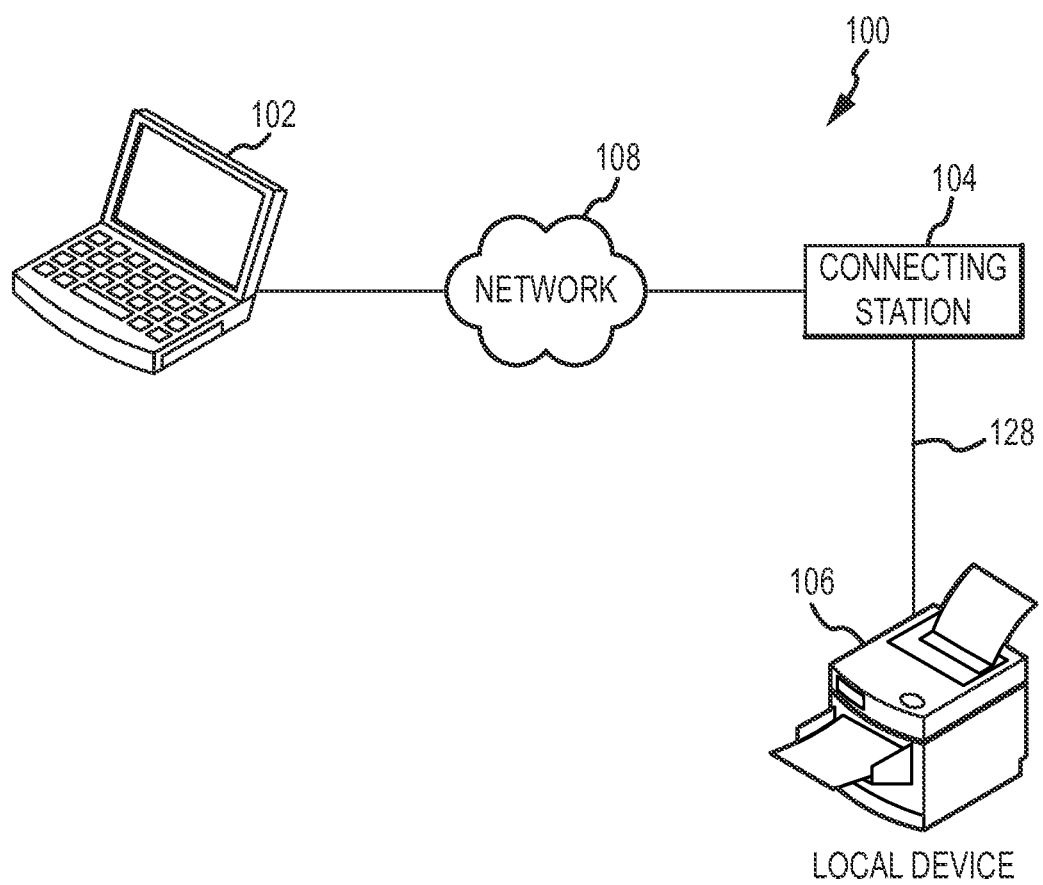
FIG. 1A is a diagram of a system for providing network access to a local device.

In an exemplary embodiment, a system for providing network access to a local device by one or more computers may include at least one computer, a connecting station, and a local device. FIG. 1A is a block diagram of a system 100 for providing network access to a local device. The system 100 may include a computer 102 in communication with a connecting station 104 via a network 108. The connecting station 104 may then be in communication with a local device 106. Thus, the connecting station 104 is in communication with both the computer 102 and the local device 106. In this embodiment, communications between the computer 102 and the local device 106 may be transmitted via the connecting station 104. The connecting station 104 may provide the computer 102 access to the local device 106 (or select functions of the local device 106) via the network 108, although the local device 106 may not be originally configured to be a networked device.

Figure 1B:
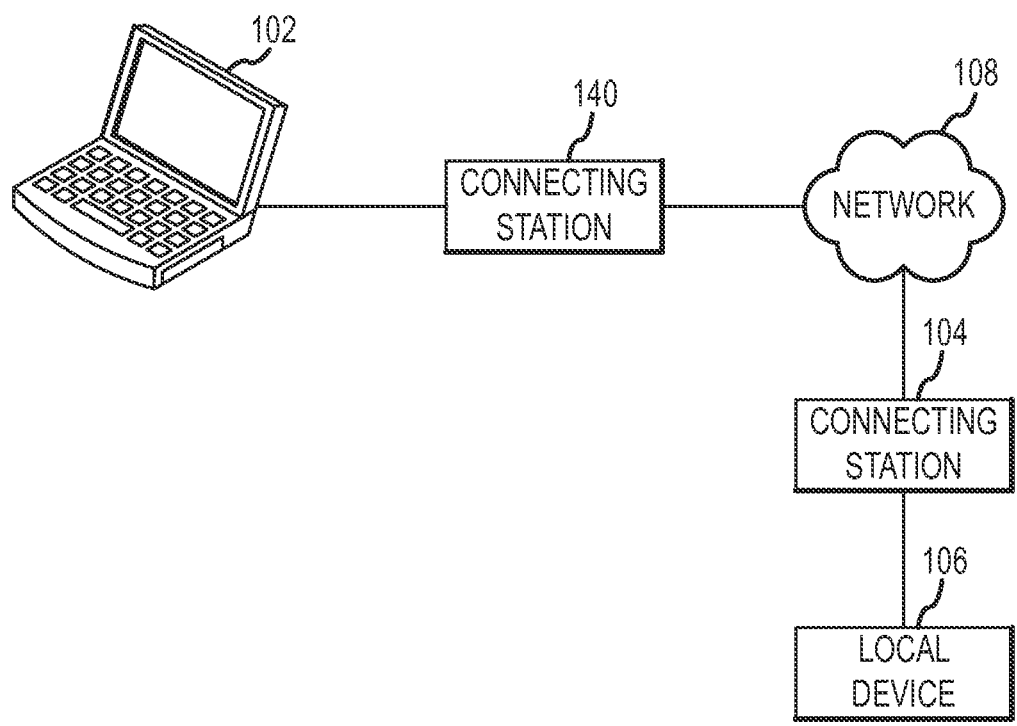
FIG. 1B is a diagram of another embodiment of a system for providing network access to a local device.

FIG. 1B is a block diagram of another embodiment of the system 100. In this embodiment, the computer 102 may be connected to a second connecting station 140, which may then (via the network 108) connect to the first connecting station 104. Similarly, although not shown in FIG. 1B, the connecting stations 104, 140 may be configured to communicate directly to each other without the network 108. For example, the connecting stations 104, 140 may be directly connected to each other, communicate via radio waves, or other networking/connecting topologies, e.g., as piconet system using Bluetooth.

Figure 1C:
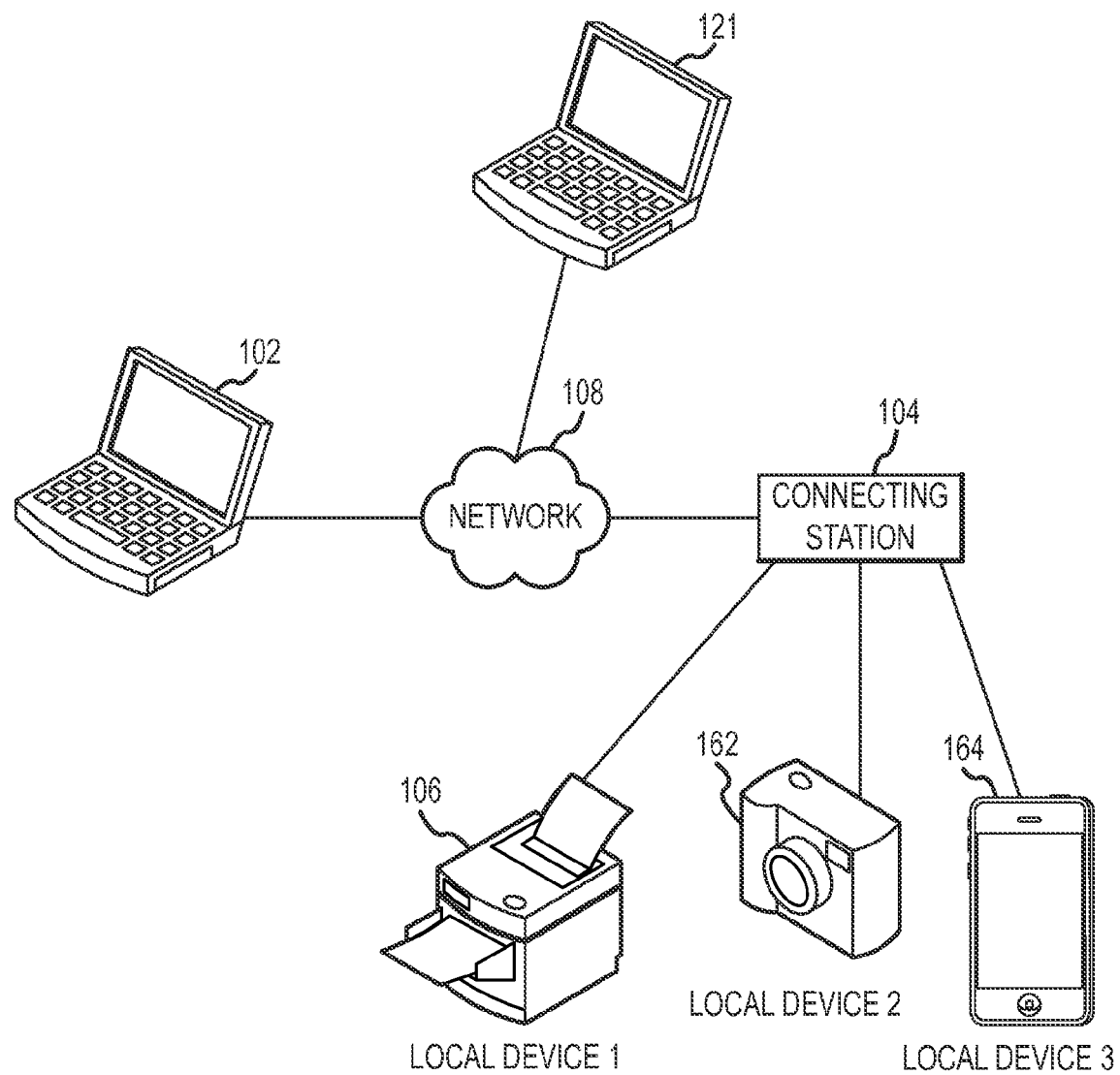
FIG. 1C is a diagram of another embodiment of a system for providing network access to a local device.

FIG. 1C is a block diagram of another embodiment of the system of FIG. 1A. In this embodiment, the connecting station 104 may be connected to multiple local devices 106, 162, 164. Additionally, the connecting station 104 may also be connected (via the network 108) to the computer 102 and/or a second computer 121. In this manner, the connecting station 104 may provide a single connection for the computer 102, 121 to multiple local devices 106, 162, 164. The local devices 162, 164 may be substantially any type of local device, such as a digital camera, audio device, storage device, or printer.

FIG. 2 is a block diagram of the system illustrated in FIG. 1A. The computer 102 may be substantially any type of electronic computing device. For example, the computer 102 may be a personal computer, laptop, tablet computer, smart phone, video game console, and so on. The computer 102 may include a processor 110, an input/output interface 112, a network/communication interface 116, and memory 114. The various components within the computer 102 may be electronically connected together via a system bus 118 (or multiple system buses). The computer 102 may include additional local or remote components that are not shown; and FIG. 2 is meant to be exemplary only.

The network/communication interface 116 may receive and transmit various electrical signals. For example, the network/communication interface 116 may be used to connect the computer 102 to the network 108 in order to transmit and receive signals to and/or from the connecting station 104, as well as other devices and computers on the network 108. The network communication interface 116 may also be used to transmit and send electronic signals via a wireless or wired connection (including, but not limited to, Internet, WiFi, Bluetooth, Ethernet, USB, and Firewire).

The memory 114 may store electronic data that may be utilized by the computer 102. For example, the memory 114 may store electrical data containing any type of content, including, but not limited to, audio files, video files, document files, and data files. Stored data may correspond to one or more various applications and/or operations of the computer. The memory 114 may be of any format, including, but not limited to, non-volatile storage, a magnetic storage medium, optical storage medium, magneto-optical storage medium, electrical storage medium, read only memory, random access memory, erasable programmable memory, and flash memory. The memory may be provided local to and/or remote from the computer.

The processor 110 may control the operation of the computer 102 and its various components. The processor 110 may be in communication with the connecting station 104. The processor 110 may be substantially any electronic device cable of processing, receiving, and/or transmitting instructions. For example, the processor 110 may be microprocessor or a microcomputer.

The input/output interface 112 facilitates communication by the computer 102 to and from a variety of devices/sources. For example, the input/output interface 112 may receive data from a user (e.g., via a keyboard, touch sensitive surface, mouse, audible input or other device), control buttons on the computer 102 (e.g., power button, volume buttons), and so on. Additionally, the input/output interface 112 may also receive/transmit data to and from an external drive, e.g., a universal serial bus (USB), or other video/audio/data inputs.

Referring again to FIG. 1A, the network 108 provides electronic communication between the connecting station 104 and the computer 102. The network 108 may be virtually any type of electronic communication mechanism/path and may be wireless or wired, or a combination of wired and wireless. For example, the network 108 may include the Internet, Ethernet, universal serial bus cables (USB), or radio signals (e.g., WiFi, Bluetooth). In one example, the network 108 may be a local area network (LAN), however in other examples, the network 108 may be a wide area network (WAN), or network topologies may be utilized as desired for any given implementation.

Referring now to FIGS. 1 and 2, the connecting station 104, may be substantially any type of computing device configured to provide communication between two devices. The connecting station 104 is configured to provide electronic communication to and from the computer 102 and the local device 106. The electronic communication between the two devices may utilize any connection topology include wired and/or wireless topologies. Further, such connection between the connecting station 102 and the local device 106 may be direct or indirect. For example, the local device 106 may be directly connected to the connecting station 104 and the computer 102 may be wirelessly connected to the connecting station 104. However, other setups may be used, e.g., the computer 102 and the local device 106 may both be wirelessly connected to the connecting station 104, and so on. Additionally, the connecting station 102 may provide router functions. In other words, the connecting station 102 may receive and send data packets from one device to another.

The connecting station 104 may include a processor 120, a network communication interface 124, memory 126, and a system bus 130 that may electrically connect the various components. The processor 124 may be substantially similar the processor 110 in the computer 102; however, depending on the desired applications, the processor 124 in the connecting station 104 may be generally less powerful than the computer 102. Similarly, the memory 126 may be substantially the same as the memory 114 in the computer 102, although the memory 126 in the connecting station 104 may be configured to store (generally) less data. External memory and data storage services can also be utilized, separately or in combination with memory 126, as desired for any given implementation.

The network/communication interface 124 may also be, but need not be, substantially the same as the network/communication interface 116 in the computer 102. The network/communication interface 124 may be further configured to provide network 108 access to certain devices, connect devices to each other, perform networking functions between and amongst multiple, perhaps disparate, computers and local device and perform other network and connectivity management functions. For example, the network/communication interface 124 may provide router functions to the computer 102, local device 106, and other devices connected, directly or indirectly, therewith.

Still referring to FIGS. 1A and 2, the local device 102 may be practically any device that may be electronically connected to a computer. Additionally, the local device 102 may be a device configured to be locally connected to a computer, that is, connected to a computer directly and not as part of a network. For example, the local device 106 may be a printer, scanner, camera, video camera, storage, and the like. Further, in some examples, the local device 102 may be configured to offer multiple services or applications. In these examples, the local device 102 may be configured so that one, but not all of the services or applications, offered by the device 102 may be offered through a network. For example, the local device 102 may be a multi-function device offering multiple services or functions, such as printing, coping, storage, and scanning; however, only the printer function may provide functionality as a networked service. It should be noted, that the local device 106 may be a multi-function device or a single function device.

In some embodiments, the local device 106 may be configured to be operably connected to a computer 102 via connection 128. The connection 128 may be wired or wireless connection, such as a cable. If wired, the cable may be substantially any type of cable for supporting electronic communications, and in one example, the cable 128 may be a USB. As shown in FIG. 1A, the local device 106 may be in communication with the connecting station 104 via connection 128.

Referring again to FIG. 1A, the system 100 may provide the computer 102 network access to the local device 106, although the local device 106 may generally be configured to communicate directly through the connection 128. This may allow, in some embodiments, the connecting station 104 and computer 102 to be able to be backwards compatible with the local device 102. In other words, the local device 106 may not have the networking capabilities, but the connecting station 104 can provide network capabilities to the functions offered by the local device 106. Furthermore, the local device 106 may be communicatively connected to other devices and computers via the connecting station 104 and the network 108, without substantially requiring modifications to either the software of the device (e.g., drivers), or the hardware of the device (e.g., networking cards, modules, and so on).

The connecting station 104 can provide network capabilities to a number of different devices that may not have been originally configured to provide network capabilities. This allows a local device 106 to function as a network device, but without the increased expense that a network device may usually require, e.g., acquiring rights to the protocol stacks utilized in conjunction with many networking topologies. Additionally, the local device 106 may be able to be accessed and used by multiple computers, which may allow multiple users to access the same device at substantially the same time and without concern as to the geographic proximity of the given user's computer and the local device.

Figure 3:
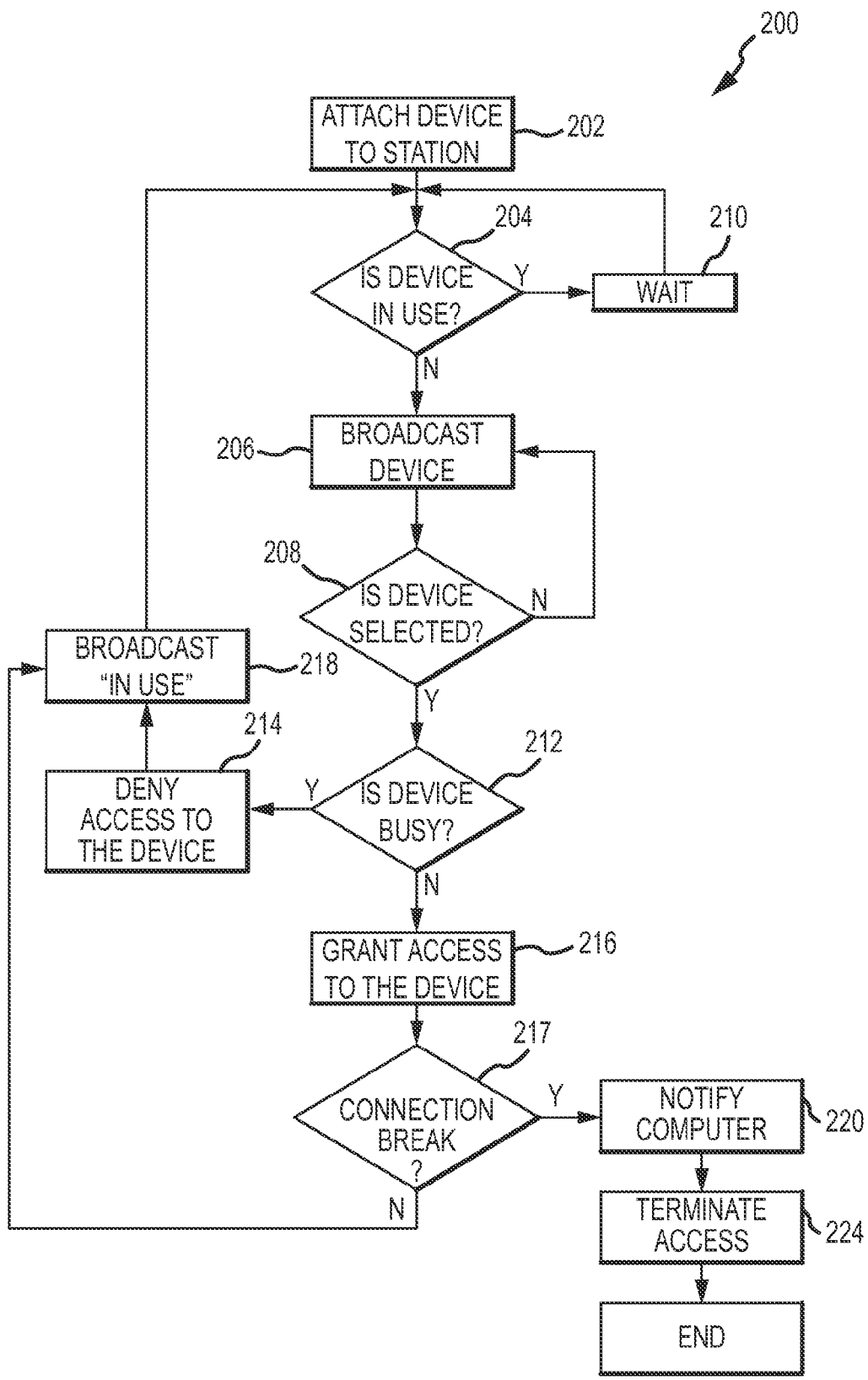
FIG. 3 is a flow diagram illustrating one embodiment for providing local access to the local device via a network.

FIG. 3 is a flow diagram illustrating one embodiment of a method to advertise the availability of the local device 106, as well as arbitrate computer access to the device via the network. The method 200 may provide remote virtualization to provide communication between the local device 106 as well as the computer 102, but also may generally regulate or arbitrate access by the computer 102 to the local device 106. The method 200 may begin with operation 202 and the local device 106 may be communicatively connected to the connecting station 104.

Once the local device 102 is in communication with the connecting station 104, the method 200 may proceed to operation 204 and the connecting station 104 may determine whether the local device 106 is in use or otherwise available for use, e.g., the local device 106 may be in use, but may have a buffer allowing it to receive additional inputs. This operation may determine whether the local device 106 is busy, or if the local device 106 provides multiple functions the specific functions that may be currently available. Additionally, in some embodiments, the connecting station 104 may determine status information from the local device 106, such as whether the local device 106 may be available in a certain amount of time. If the local device 106 is in use or otherwise unavailable, the method 200 may proceed to operation 210 and the connecting station 104 may wait for a predetermined, determined, random or select time until the local device 106 may no longer be in use or unavailable.

Once the local device 106 (or the specific function) is available for the given computer to access, the method 200 may proceed to operation 206. In operation 206, the connecting station 104 may broadcast an advertisement or other alert over the network 108. For example, the connecting station 104 may use a service discovery protocol, such as, domain name system service discovery (DNS-SD), to advertise each local device 106 that may be shared as a service over the network.

The alert or advertisement may include a notice that the local device 106 is available. In other embodiments, the presence of the alert or advertisement may itself indicate that the local device 106 is available. In other words, the connecting station 104 may only provide an advertisement or alert for the local devices 106 that are actually available. Therefore, if a local device 106 is busy, it may not have an advertisement or alert. Similarly, any connected devices that are either busy or not capable of being shared may not be advertised. Furthermore, when the local device 106 is disconnected from the connecting station 104, the connecting station 104 may no longer advertise the particular device. In this manner, superfluous advertisements may be avoided and only local devices 106 that may be shared may be advertised.

The broadcast may be transmitted so that each computer 102 can be configured to receive the advertisement. For example, the computer 102 may use the same or similar service discovery protocol as the connecting station 104 and may receive advertisements, as well as updates to the existing advertisements.

Additionally, it should be noted that the connecting station 104 may further be in communication with multiple devices, and each device (or select devices) may also be broadcast on the network 108. Therefore, the broadcast may include multiple different devices that all may be available to the different computers 102 in communication with the network 108. It should be noted that in some alternative embodiments, the computer 102 and the connecting station 104 may communicate on a challenge and reply basis. For example, the computer 102 may query the connecting station 104 to see if there are any available devices prior to receiving a broadcast.

The broadcast or advertisement by the connecting station 104 may include information regarding the local device 106. This information may allow user (or computer 102) to determine whether or not he or she wishes to connect to the local device 106. The information may include the vendor information (e.g., brand name), serial number, and other relevant information, e.g., functions offered by the local device 106.

Once the local device 106 has been broadcast on the network 108, the method 200 proceeds to operation 208 and the connecting station 104 determines whether the computer 102 has requested exclusive access to the local device 106. The selection process by the computer 102 is discussed in more detail with respect to FIG. 4. However, when the computer 102 requests access to the local device 106, the computer 102 may place a call to the connecting station 104 indicating that it wishes to connect to the local device 106 (or function). Once the local device 106 is selected, the method 200 may proceed to operation 212.

Operation 212 determines whether the local device 106 is busy. The connecting station 104 may determine if a computer 102 currently has exclusive access to the local device 106 and/or whether the desired function of the local device 106 is in use.

In alterative embodiments, the local device 106 may also be considered to be busy if the computer 102 has access to the local device 106 and is currently communicating with the local device 106, or may communicate with the local device 106 in the future. However, these embodiments may be more difficult to implement. This may be because future communication between the local device 106 and the computer 102 may be difficult to predict. For example, if the local device 106 is a printer and it runs out of paper, there may be no communication between the local device 106 and the computer 102 until more paper is fed into the device 106. As viewed by the connecting station 104, this lack of current communication may be a sign of the end of communications between the computer 102 and the local device 106, whereas it may just be a temporary condition. Therefore, generally, the local device 106 may be determined to be busy simply if a computer has exclusive access to the local device 106.

It should be noted that in some embodiments, the broadcast in operation 206 may include a status of the local device 106, e.g., whether the local device 106 is busy. However, operation 212 may be completed for the instances where the local device 106 may become busy between operation 206 and operation 212. But, it should be noted that in some embodiments, operation 212 may be omitted, as operation 206 may not be performed unless in operation 204 the connecting station 104 determines that the local device 106 is not in use. In this embodiment, the connecting station 104 may not broadcast the local device 106 as being available if the local device 106 is currently in use/busy.

If in operation 212 the connecting station 104 determines that the local device 106 is busy, then the method 200 may proceed to operation 214. Operation 214 may deny the computer 102 access to the local device 106 (or function). For example, the connecting station 104 may provide an alert message to the computer 102 that the local device 106 (or function) is no longer available.

Once the connecting station 104 has denied the computer 102 access to the local device 106, the method 200 may proceed to operation 218. Operation 218, broadcasts that the local device 106 (or function) is in use. For example, the original broadcast advertisement from operation 206 may be altered to indicate that the local device 106 is busy or the advertisement may simply be removed. Additionally, the in use advertisement may also include information, relating to the computer 102 accessing the local device 106, such as an identifier. The method 200 may then return to operation 204, and the connecting station 104 may once again check to determine if the local device 106 (or function) is in use. If the local device has been detached, then operation 204 may indicate that the local device 106 is once again available.

If in operation 212 the connecting station 104 determines that the local device 106 is not busy, the method 200 proceeds to operation 216 and the computer 102 is granted access to the local device 106. The local device 106 is then communicatively coupled with the computer 102. The local device 106 may then be considered to be "attached" to the computer 102, but it should be noted that the local device 106 may be attached "virtually" and not "physically" attached to the computer 102. That is, the local device 106 may be directly connected, via connection 128 to the connecting station 104, and through the connecting station 104, the local device 106 may be attached or in communication with the computer 102.

Figure 4:
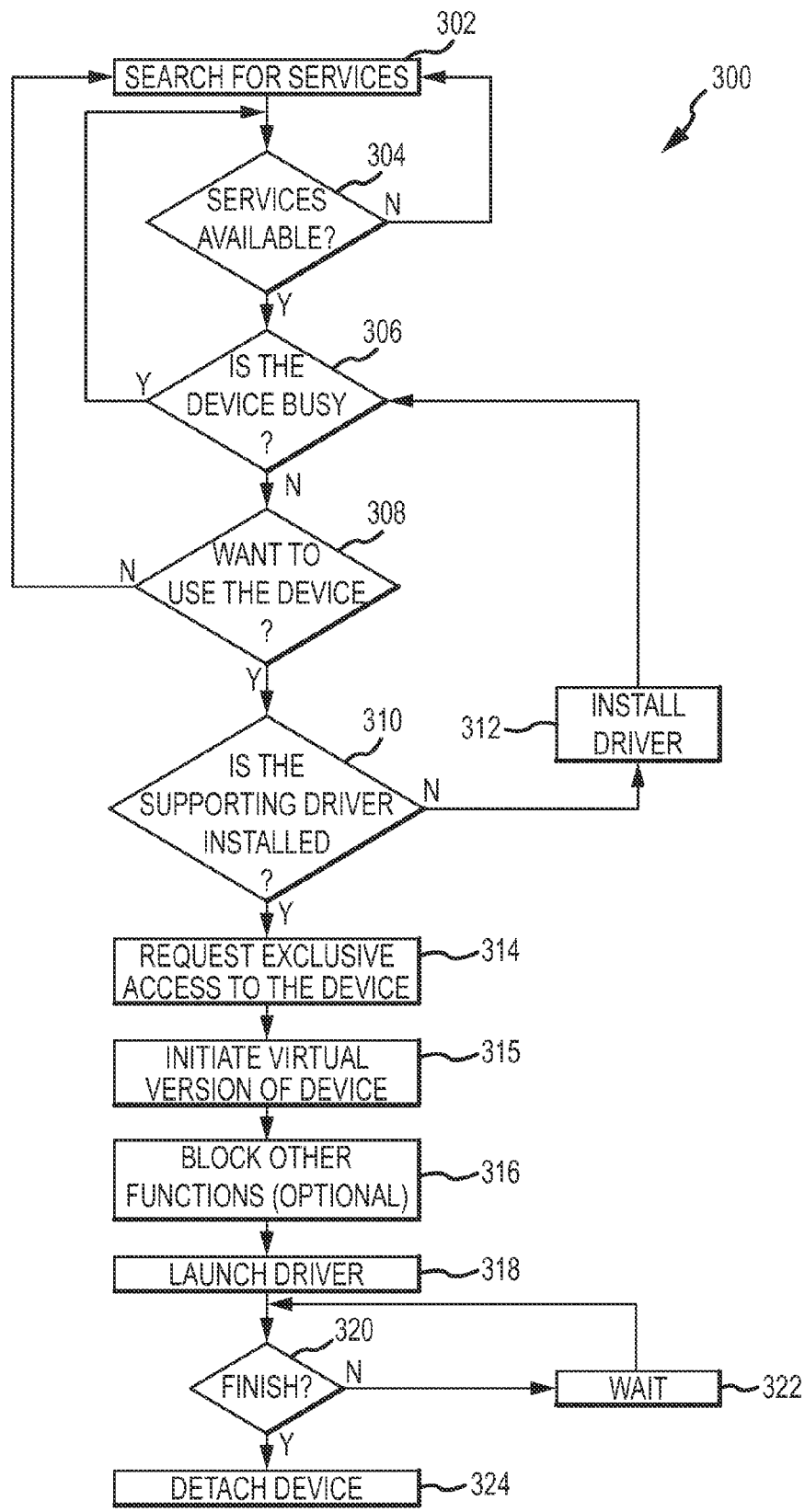
FIG. 4 is a flow chart illustrating an embodiment of a method for connecting the local device to the computer via the network.

As discussed in more detail with respect to FIG. 4, once the local device 106 is virtualized on the computer 102, the computer 102 may then view the local device 106 as local. It should be noted that in some embodiments, attaching the local device 106 may involve connecting a discrete function of the local device 106 to the computer 102. For example, if the local device 106 has both a scanning function and a printing function, the local device 106 may be connected to the computer 102 only with respect to one function, e.g., the printing function, and not for other functions.

In some embodiments, the local device 106 may not be attached to the computer 102 until operation 216. This means that there may not be a connection between the local device 106 and the computer 102 until initiated by the user (via the computer 102). This may prevent the computer 102 from monopolizing the function or the entire local device 106 until the function or the local device 106 may actually be utilized. Because the local device 106 may not be configured as a "network" device, the local device 106 may only be configured to provide a single function or connection at a time. Therefore, by preventing the computer 102 from connecting to the function or local device 106 until the function will actually be utilized, the local device 106 is available to connect to other computers in the downtime between use.

Once the local device 106 (or discrete function) has been connected to the computer 102, the method 200 may proceed to operation 217. The connecting station 217 may determine whether there has been a connection break between the computer 102 and the local device 106. For example, the local device 106 or computer 102 may have died, lost a connection to the network 108, or otherwise be prevented from communicating. If the connection between the local device 106 and the computer 102 has not been broken, the method 200 may proceed to operation 218.

In operation 218 the connecting station 104 may broadcast, via the network 108, that the local device 106 is in use. The broadcast may allow other computers and devices accessing the network 108 to view that the local device 106 (or certain functions of the local device 106) may be unavailable. The method 200 may then return to operation 204 and the connecting station 104 may determine whether the local device 106 is in use.

If, in operation 217 the connection between the local device 106 and the computer 102 is broken, the method 200 may proceed to operation 220. The connecting station 104 may notify the computer 102 (or the local device 106) that access is no longer available. The connecting station 104 may then terminate the computer's 102 access to the local device 106 and the method 200 may end. It should be noted that at substantially any point while the connecting station 104 is providing the computer 102 access to the local device 106, the connecting station 104 may check to determine if the connection between the two has been broken. This may prevent the computer 102 from monopolizing access the local device 106 if the connection between the computer 102 and the local device 106 is broken.

FIG. 4 is a flow chart illustrating an embodiment of a method for connecting the local device 106 (or a function of the local device 106) to the computer 102 via the network 108. The method 300 may begin with operation 302 and the computer 102 may search the network 108 for devices and services that may be available via the network 108. Operation 302 may be performed at startup of the computer 102, when a user selects an application to view available device/services, the computer 102 may continuously scan the network 108 to look for available devices and services, or the like.

In operation 302, the computer 102 may scan or search the network 108 by searching for the broadcast alerts or advertisements, such as the advertisements by the connecting station 104 in operations 206, 218 in method 200. The advertisement may include information regarding the local device 106, e.g., the manufacturer, part number, serial number, product name, and so on.

After operation 304, the method 300 may proceed to operation 306 and the computer 102, the connecting station 104, and/or the user may determine whether the device and/or function is busy. For example, if the local device 106 is currently being used by another computer on the network 108, the connecting station 104 may transmit another advertisement indicating that the local device 106 is busy. If the selected or desired device is busy, the method 300 may return to operation 304. However, if the local device 106 is not busy, the method 300 may proceed to operation 308. It should be noted that in some embodiments the connecting station 104 may not broadcast an advertisement if the local device 106 is busy. Therefore, depending on the desired implementation, operation 304 may be omitted.

Operation 308 determines whether the computer 102 wants to use the local device 106 advertised over the network 108. For example, the user may view the information about the local device 106 such as its available functions (e.g., printing, scanning, and so on) and then may determine that he or she wishes to use the local device 106 and may configure the computer 102 to select the local device 106 (or function). The computer 102 may then request exclusive access to the local device 106 (or function) from the connecting station 104.

If in operation 308, the user does not wish to use the selected device, the method 300 may return to operation 302 and the computer 102 may once again search for available services. If, however, the user wishes to use the local device 106, the method 300 may proceed to operation 310.

Operation 310 determines whether a driver for the local device 106 is installed. The driver may be a software packet to allow the computer 102 to better communicate with the local device 106. The driver may include information specific to the local device 106 and may be configured to interact with one or more components of the computer 102. The driver may be provided to the computer 102 via the manufacturer (e.g., via a website) and there may be a specific driver for each local device 106 and/or each function of the local device 106. If the driver is not installed, the method 300 may proceed to operation 312 and the driver may be installed. For example, many manufacturers of local devices may provide drivers for each local device on their website, and the computer 102 may download the required driver.

After the driver is installed in operation 312, the method 300 may return to operation 306 to determine if the local device 306 is busy. In some instances, installation of the driver may require the computer 102 to restart. In this case, the local device 106 may become unavailable and therefore, operation 306 once again determines if the local device 106 is available.

In some embodiments, the driver may be installed on the computer 102, rather than the connecting station 104. This is because there may be multiple local devices 106 that may be used and including the software driver on the connecting station 104 may require the connecting station 104 have more computing power and/or memory. Therefore, generally, the connecting station 104 may interact with both the local device 106 and the computer 102 using generally generic operations that may be common to both the local device 106 and the computer 102. For example, if the local device 106 includes a USB connection, the connecting station 104 may communicate read, write, and device requests to and from the local device 106 and computer 102.

However, in other embodiments, the driver may be installed on the connecting station 104. In these embodiments, the connecting station 104 may perform a translation between drivers on the computer 102 versus a driver needed by the local device 106. In this way the computer 102 may not have to be compatible with or capable of accepting a particular driver for the local device 102. For example, the computer 102 may have an outdated operating system that may not be compatible with a driver for a new local device 106. In this way, the connecting station 104 may provide a communicating mechanism to provide at least some of the functional capabilities of the local device 106 to the computer 102. It should be noted that in these examples, a communication protocol between the connecting station 104 and the computer 102 may have be expanded. The communication protocol may have to include high-level driver operations, such as, endpoints to read/write, decision order for select decisions, and to which device requests should be issued.

Once the driver is installed, the method 300 may proceed to operation 314 and the computer 102 may request exclusive access to the local device 106. For example, the computer 102 may request a local device 106 based on a network host name, network address, port number or other identifier that may be included in local device 106 advertisement. In some instances, access may be denied (as described in operation 214 in FIG. 2) as the local device 106 may become busy between the time the request is received by the connecting station 104.

If the local device 106 is not busy, the connecting station 104 grants the computer 102 access to the local device. The computer 102 may request access to the entire local device 106, or a discrete function of the local device 106 to the computer 102.

Once access is granted to the computer 102, the method 300 may proceed to operation 315. Operation 315 initiates a virtual version of the local device 106 on the computer 102. The connecting station 104 is then an intermediary between the computer 102 and the local device 106, allowing the connecting station 104 to facilitate communications between the computer 102 and the local device 106.

When the local device 106 is virtualized on the computer 102, as viewed from both the computer 102 and the local device 106, the connection may appear to be a direct connection. However, both the computer 102 and the local device 106 may only be in communication with each other through the connecting station 104, that is a non-direct connection. Additionally, when the local device 106 is attached to the computer 102, the computer 102 may view the local device 106 as a local device, such as a local USB.

The connecting station 104 and/or the computer 102 may tag the device information with a metadata tag along with its service broadcast that flags the device 106 as not being "local" in the true sense (as viewed from the computer 102). For example, all virtual device instances of the local device 106 on the computer 102 may be tagged so that they can be matched with the corresponding network service records in the computer 102 also corresponding to the local device 106. This may allow the computer 102 to present a single description of the local device 106 to the user.

In some embodiments, the computer 102 may include software that handles both network devices as well as locally attached devices. In these instances, the software may be configured to avoid treating the local device 106 attached to the connecting station 104 as two separate entities (a network device and a local device). Therefore, the listing or data corresponding to the local device 106 as broadcast on the network 108 and the local device 106 as appearing to the computer 102 may be combined together. This may allow the computer 102 to display a single description of the local device 106, rather than two separate descriptions (e.g., one as a shared device and one as a locally connected device). This may be done by the computer 102 and/or by the connecting station 104.

The computer 102 may include a dedicated background process or other software that may communicate with the connecting station 104 as well as handle aspects of the virtualization of the local device 106. In some embodiments, a software library may communicate with the background process to provide an application programming interface. The application programming interface may allow an application running on the computer 102 to use the local device 106. In this manner, the applications may be able to integrate the virtual "attaching" and "detaching" of the local device 106 in a manner that may be consistent with established user experience provided by the application. In other words, the application can connect and disconnect to the local device 106 via the background process in a way that may allow the local device 106 to be presented as directly attached (as viewed by the user).

For example, if the computer 102 includes a scanning application that includes directly connected devices and "true" network devices, the application can be made to present the local device 106 as a network device. When a user selects a particular device (e.g., from a clickable list of available models), the virtual attaching and detaching of the local device 106 to the computer 102 may be done via the application, but with help from the software library communicating with the background process.

Once the local device 106 is attached to the computer 102, the method 300 may proceed to optional operation 316 and other functions of the local device 106 may be blocked, other than the function being used by the computer 102. For example, the local device 106 may include a storage function and a scanning function. Once the computer 102 is connected to the local device 106 for a select function (e.g., scanning) other functions available on the local device 106 (e.g., retrieving stored files) may be blocked to the computer 102.

After operation 316, the method 300 may proceed to operation 318 and the computer 102 may launch the driver. Because the local device 106 may be seen as being attached locally (e.g., directly) to the computer 102, the driver may be launched and may operate properly, although the driver may not have been modified to allow the local device 106 to be attached via the network 108.

Once the driver has been launched, the computer 102 may be configured to communicate with the local device 106. The computer 102 (via the driver) may communicate with the local device 106 via the connecting station 104. This is discussed in more detail with respect to FIG. 5. As described above, when the local device 106 is attached to the computer 102, the local device 106 (or the select function) may be unavailable to other computers on the network 108. This is because as the local device 106 may not be configured to be a networked device and may only be configured to be directly connected (via cable 128) to the computer 102. Therefore, although the connecting station 104 may substantially eliminate the need for the local device 106 to directly connect to the computer 102, the local device 106 may only be configured to have a single communication path open to an from an operating device (e.g., computer 102). Additionally or alternatively, certain functions of the local device 106 may only be configured to be used by a single computer 102 at a time. For example, a scanning function may be configured to scan to a single computer at a time.

In an alterative embodiment, as shown in FIG. 1C, the connecting station 104 may be configured to effectively "trick" the local device 106 and/or the computer 102 as thinking that either or both are connected to a single other device. For example, the local device 106 (via the connecting device 104) may be "spoofed" into thinking that it is only connected to a single computer 102, when in fact it may be connected to multiple computers (e.g., one computer utilizing the scanning function and another utilizing another function). In this embodiment, the connecting station 104 may essentially act as a buffer between one or more computers 102, 120 and the local device 106.

After operation 318, the method 300 proceeds to operation 320 and the connecting station 104 and/or the local device 106 determines whether the computer 102 has finished using the local device 106. For example, the application using the local device 106 may be completed, the computer 102 may notify the connecting station 104 (e.g., via their point-to-point communication protocol) that it is done with the local device 106. The connecting station 104 may then update the advertisement of the local device 104 to reflect the current status of the local device 106, that is, that the local device 106 is now available.

If the computer 102 is not yet finished with the local device 106, the method 300 may proceed to operation 322 and a wait loop may pause the method 300 so that the computer 102 may finish. Once the computer 102 has finished with the local device 106, the method 300 may proceed to operation 324 and the virtual connection between the computer 102 and the local device 106 may be "detached" and the "in-use" flag reset (as appropriate). The connecting station 104 may terminate the "virtual" connection between the local device 106 and the computer 102.

Figure 5:
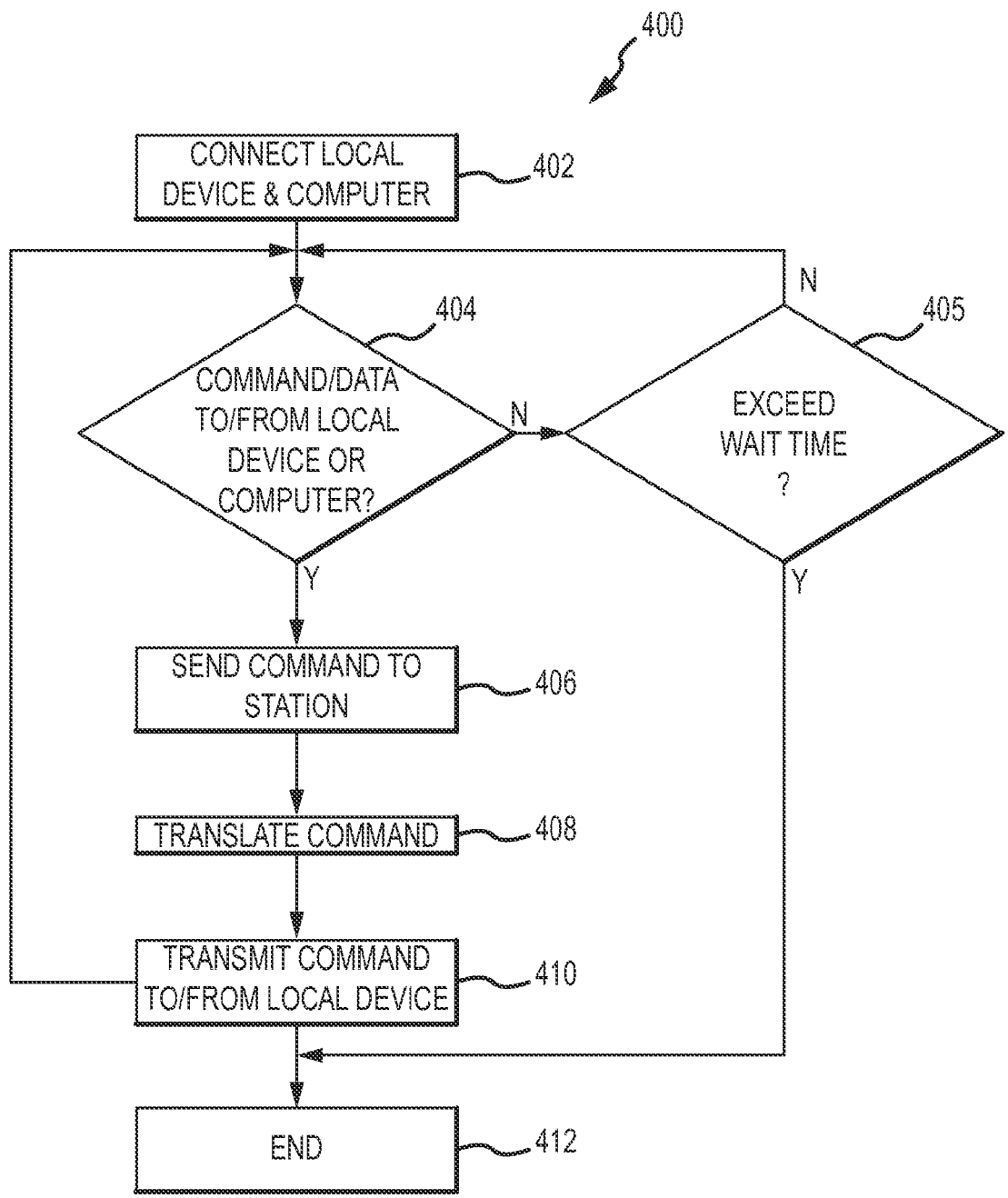
FIG. 5 is a flow diagram of one embodiment of a method for the connecting station to facilitate communication between the local device and the computer via the network.

FIG. 5 is a flow diagram of one embodiment of a method 400 for the connecting station 104 to facilitate communication between the local device 106 and the computer 102 via the network 108. The method 400 may begin with operation 402 and the connecting station 104 may exclusively couple or establish a logical connection between the local device 106 and the computer 102. For example, the local device 106 may attach to the computer 102 as described in operations 216, 314 in FIGS. 4 and 5, respectively. Once the local device 106 and the computer 102 are in communication via the connecting device 104, the method 400 may proceed to operation 404.

Operation 404 determines whether the local device 106 and/or the computer 102 have a command and/or data that may need to be transfer to the other. The command or data may include a request such as read, write, retrieve information, reset, and so on. It should be noted that generally the local device 106 will not issue commands to the computer 102. Rather, generally, the computer 102 may exclusively request commands to the local device 106. Additionally, as discussed below with respect to operation 410, each request by the computer 102 is actually carried out by the connecting station 104.

If the local device 106 and/or the computer 102 has a command for the other, the method 400 may proceed to operation 406. If, on the other hand neither the local device 106 nor the computer 102 has a command or data request for the other, the method 400 proceeds to operation 405.

Operation 405 determines whether a predetermined wait time has been exceeded. For example, if the computer 102 becomes unresponsive (e.g., loses a connection to the network 108, crashes, etc.) the connecting station 104 may revoke the computer's 102 access to the local device 106 after the wait time. As operation 405 may terminate a connection, it may prevent the computer 102 from monopolizing an exclusive access to the local device 106, despite the fact that the computer 102 may not longer be able to communicate with the connecting station 104 and the local device 106.

If neither the local device 106 nor the computer 106 have instructions for the other for a set period of time operation 405 determines whether the wait time has been exceeded, so that the method 400 may not proceed in an infinite loop. If there are no instructions after a set period of time, the method 400 may proceed to the end 412. However, if in operation 405 the wait time has not yet been exceed the method 400 may proceed back to operation 404 to determine whether there are any instructions. It should be noted that operation 405 may be a wait time period, number of cycles or other check in order to potentially prevent an infinite loop condition.

Additionally, in some instances, keep alive packets may be periodically sent between the computer 102 and the connecting station 104 The keep alive packets may alert the connecting station 104 that the computer 102 is still responsive and that the connection between the local device 106 and the computer 102 is still valid. When the connecting station 104 receives a keep alive packet it may restart the time out timer and/or number of cycles before timeout. The keep alive packets may prevent the connecting station 104 from terminating an idle, but still responsive, connection between the computer 102 and the local device 106. For example, a lack of communication between the computer 102 and the local device 106 may not signify that the computer 102 has become unresponsive.

Once a command and/or data has been received, the method 400 proceeds to operation 406, and the command and/or data from the local device 106 or computer 102 is transmitted to the connecting station 104. Once the connecting station 104 receives the command and/or data, the connecting station 104 may translate the command and/or data at operation 408. The connecting station 104 translates the command and/or data because commands and/or data may be configured for a direct connection. For example, the local device 106 may be configured to communicate directly between the computer 102 and because the local device 106 is communicating to the computer 102 via the network 108, the commands and/or data may be translated so as to appear to be locally transmitted.

Once the command and/or data is transmitted, the method 400 proceeds to operation 410 and the command and/or data may be transmitted to or from the local device 106. For example, the computer 102 may issue a read command from the local device 106 and after the command as been properly translated, the connecting station 104 may transmit the command to the local device 106. Similarly, the local device 106 may send data to the connecting station 104, which once it has been translated may then be transferred (via the network 108) to the computer 102.

CONCLUSION

The foregoing description has broad application. For example, while examples disclosed herein may focus on providing access to a local device via a network, it should be appreciated that the concepts disclosed herein may equally apply to other types of devices that may be configured for a specific communication scheme. Similarly, although the network and connecting station may be discussed with respect to a local device, the devices and techniques disclosed herein are equally applicable to specific functions or services provided by multiple devices. Accordingly, the discussion of any embodiment is meant only to be exemplary and is not intended to suggest that the scope of the disclosure, including the claims, is limited to these examples.

What is claimed is:

1. A method for providing a local device service, via a connecting station, to at least one computer comprising:
   determining, by a connecting station, whether a local device directly and locally communicatively coupled to the connecting station is busy, wherein the local device is only configured to communicate with the connecting station;
   broadcasting, by the connecting station, to at least one computer communicatively coupled to the connecting station locally or via a network an available first service provided by the local device; and
   providing, by the connecting station, to a given one of the at least one computer access to the local device if the local device is not busy and is selected by the given computer, wherein providing access to the given one of the at least one computer comprises:
   receiving one or more commands for the local device from the given one of the at least one computer, wherein the commands are configured for a direct connection between the given one of the at least one computer and the local device;
   translating the commands, wherein the translated commands are configured to appear, from a point of view of the local device, to be a request derived not from the given one of the at least one computer but rather locally from the connecting station; and
   transmitting the translated commands to the local device.

2. The method of claim 1, wherein if the local device is busy the method further comprises the step of preventing the given one of the at least one computer from accessing the local device.

3. The method of claim 1, wherein the local device is a multi-function local device.

4. The method of claim 1, further comprising broadcasting an available second service provided by the local device simultaneously with broadcasting the first service of the local device.

5. The method of claim 1, wherein the connecting station broadcasts the available first service provided by the local device over the network.

6. A method for connecting a computer to a service provided by a local device over a network comprising:
   determining, by the computer, whether a service is available over the network;
   communicating, by the computer to a connecting station, a first selection of a local device configured to provide the service;
   receiving, by the computer, a response from the connecting station that the local device is available;
   launching a driver corresponding to the local device on the computer; and
   accessing, by the computer through the connecting station, the local device, wherein accessing the local device comprises:
   receiving one or more commands for the local device from the computer, wherein the commands are configured for a direct connection between the computer and the local device;

translating the commands, wherein the translated commands are configured to appear, from a point of view of the local device, to be a request derived not from the computer but rather locally from the connecting station; and transmitting the translated commands to the local device.

7. The method of claim 6, wherein the connecting station provides a broadcast listing available services over the network.

8. The method of claim 6, wherein prior to determining whether there is the service available over the network, launching an application on the computer requesting the service.

9. The method of claim 6, wherein prior to providing the computer access to the local device, the method further comprises determining whether at least one service offered by the local device is busy.

10. The method of claim 6, wherein the service is one of a printing function, scanning function, or copying function.

11. The method of claim 6, wherein providing the computer access to the local device comprises creating a communication path to the connecting station from the local device and the computer.

12. A connecting station for providing network access to a local device comprising:
   a network interface configured to receive:
      a service notification from a local device; and
      a selection notification from a computer;
   a processor in communication with the network interface and configured to:
      broadcast the service notification from the local device over a network to the computer;
      provide the computer access to the local device when the computer transmits the selection notification to the network interface, wherein the processor is configured to provide the computer access to the local device by:
         receiving one or more commands for the local device from the computer, wherein the commands are configured for a direct connection between the computer and the local device;
         translating the commands, wherein the translated commands are configured to appear, from a point of view of the local device, to be a request derived not from the computer but rather locally from the connecting station; and
         transmitting the translated commands to the local device; and
      when the computer is accessing the local device, communicate to at least one second computer that the local device is busy.

13. The connecting station of claim 12, wherein the processor is further configured to receive a computer command from the computer.

14. The connecting station of claim 12, wherein the processor is further configured to provide a router function.

15. One or more tangible, non-transitory computer-readable media comprising instructions configured to be executed by a processor of a connecting station, the instructions to:
   connect the connecting station to a computer via a network, wherein the connecting station and the computer are discrete electronic devices from one another;
   connect the connecting station to a local device via a local connection, wherein the local device comprises a digital camera, an audio device, a storage device, a digital scanner, or any combination thereof;
   determine whether the local device is currently busy;
   broadcast to the computer an available first service provided by the local device; and
   permit to the computer exclusive access to the local device only when the local device is not currently busy, wherein the computer is permitted exclusive access to the local device by:
      receiving one or more commands for the local device from the computer, wherein the commands are configured for a direct connection between the computer and the local device;
      translating the commands, wherein the translated commands are configured to appear, from a point of view of the local device, to be a request derived not from the computer but rather locally from the connecting station; and
      transmitting the translated commands to the local device.

* * * * *